United States Patent [19]

Turke et al.

[11] Patent Number: 5,041,491
[45] Date of Patent: Aug. 20, 1991

[54] POLYPROPYLENE WITH IMPROVED IMPACT PROPERTIES

[75] Inventors: Richard M. Turke, Hinsdale; Robin M. Gryziecki, Aurora; David V. Howe, Glen Ellyn, all of Ill.

[73] Assignee: Amoco Corporation, Chicago, Ill.

[21] Appl. No.: 429,318

[22] Filed: Oct. 31, 1989

[51] Int. Cl.$^5$ .............. C08L 23/18; C08L 23/10; C08K 3/00
[52] U.S. Cl. .................. 524/425; 524/490; 524/528; 525/240
[58] Field of Search ........... 525/240; 524/490, 425

[56] References Cited

U.S. PATENT DOCUMENTS

| | | | |
|---|---|---|---|
| 4,078,020 | 3/1978 | Rose et al. | 260/897 A |
| 4,311,807 | 1/1982 | Mccullough et al. | 525/197 |
| 4,459,385 | 7/1984 | McCullough | 525/88 |
| 4,500,681 | 2/1985 | Shulman | 525/222 |
| 4,634,735 | 1/1987 | Thiersault et al. | 525/240 |
| 4,761,450 | 8/1988 | Lakshmanan et al. | 525/240 |
| 4,774,292 | 9/1988 | Thiersault et al. | 525/240 |
| 4,916,190 | 4/1990 | Hwo | 525/240 |

FOREIGN PATENT DOCUMENTS

| | | |
|---|---|---|
| 0092318 | 10/1983 | European Pat. Off. . |
| 59-043043 | 3/1984 | Japan . |
| 59-049921 | 3/1984 | Japan . |
| 59-0413420 | 3/1984 | Japan . |
| 60-203653 | 10/1985 | Japan . |
| 2152516 | 8/1985 | United Kingdom . |

OTHER PUBLICATIONS

Amoco Chemicals Company Bulletin 12-35 Entitled "Improve the Impact Resistance of Thermoplastics with AMOCO Polybutenes".

*Primary Examiner*—Carman J. Seccuro
*Attorney, Agent, or Firm*—Robert G. Ladd; William H. Magidson; Ralph C. Medhurst

[57] ABSTRACT

A modified propylene polymer composition of improved low temperature impact resistance comprising about 55 to about 80 weight percent polypropylene homopolymer, about 15 to about 30 weight percent linear low density polyethylene and about 5 to about 15 weight percent polybutene.

13 Claims, No Drawings

POLYPROPYLENE WITH IMPROVED IMPACT PROPERTIES

FIELD OF THE INVENTION

This invention relates to a polymer composition having improved low temperature impact resistance. More particularly, this invention relates to blends of polypropylene, linear low density polyethylene and polybutene useful for extruded films and injection molded applications.

BACKGROUND OF THE INVENTION

Polypropylene is a commercial polymer used for a variety of products such as packaging films and extruded and molded shapes. Polypropylene is typically deficient in impact resistance at temperatures of 0° C. and below. Various polymers have been blended with polypropylene in order to increase the impact resistance. An Amoco Chemical Company Bulletin 12-35 titled "Improve the Impact Resistance of Thermoplastics with Amoco Polybutenes" discloses that the room temperature, 70° F. Gardner impact of polypropylene is increased by the addition of 5 or 10 parts-per-hundred resin (phr) of L-14, H-100 and H-300 grades of Amoco polybutene. However, the low temperature, −30° F., Gardner impact is not changed by the addition of polybutene. Combinations of polypropylene with other thermoplastics are discussed below.

U.S. Pat. No. 4,459,385 discloses extruded or molded shapes from compositions of ethylene-propylene copolymers and linear low density polyethylene (LLDPE) which possess extremely good impact resistance without excessive loss of stiffness. Examples N and O of this patent indicate that 15 or 20 percent LLDPE blended with mixtures of propylene homopolymer containing 5 to 11 percent of ethylene-propylene rubber does not provide any substantial increase in impact strength.

U.S. Pat. No. 4,500,681 discloses a thermoplastic elastomeric blend composition comprising about 20 to about 65 weight percent of a polyolefin component, about 20 to about 60 weight percent of an isobutylene-backbone elastomer and about 7 to about 40 weight percent of an ethylene copolymer.

U.S. Pat. No. 4,078,020 discloses a thermoplastic composition comprising polypropylene, polybutylene and 20 to 80 weight percent of an elastomeric material such as an ethylene-propylene-diolefin elastomer.

U.S. Pat. No. 4,311,807 discloses a masterbatch composition for the production of impact resistant polypropylene comprising about 25 to 70 weight percent of an uncured elastomer, about 30 to 75 weight percent of an isotactic butene-1 polymer and optionally about 10 to 40 weight percent of a co-modifier selected from the group consisting of high density polyethylene, propyleneethylene copolymer, polypropylene and mixtures thereof.

JP 60-203653 discloses a film made from a blend of 5 to 95 weight percent of linear low density polyethylene and 95 to 5 weight percent of polypropylene.

JP 59-049921 discloses a coating composition comprising 70 to 96 weight percent of crystalline polypropylene, 2 to 15 weight percent low density polyethylene and 2 to 15 weight percent amorphous ethylene-alpha-olefin copolymer.

JP 59-043043 discloses a resin composition used for film manufacture comprising 100 parts by weight of polypropylene, 3 to 10 parts by weight of linear low density polyethylene and 5 to 15 parts by weight of an ethylene alpha-olefin copolymerized elastomer.

JP 59-041342 discloses a resin molding composition comprising 95 to 60 parts by weight of linear low density polyethylene and 5 to 40 parts by weight of polypropylene.

EP 0 092 318 discloses a film-forming thermoplastic elastomer blend comprising a polyolefin component chosen from polypropylene homopolymer, polypropylene copolymer, polybutylene, high density polyethylene and mixtures of these polyolefin components; an elastomeric plasticiser comprising polyethylene or a copolymer of ethylene and an unsaturated ester of a lower carboxylic acid; an olefinic elastomer and a hydrocarbon oil.

GB 2152516 discloses a thermoplastic blend comprising 70 to 95 weight percent of linear low density polyethylene, 2 to 30 weight percent of polypropylene or propylene-ethylene copolymer and less than 2 weight percent of an ethylene-propylene-diene terpolymer or an ethylene-propylene rubber.

However, none of these patents disclose or suggest a composition comprising about 55 to about 80 weight percent polypropylene homopolymer, about 15 to about 30 weight percent linear low density polyethylene and 5 to about 15 weight percent polybutene which has improved impact resistance at ambient temperature and also at −40° F.

An object of this invention is to provide a modified polymer composition with improved low temperature impact resistance.

Another object of this invention is to provide a composition comprising about 55 to about 80 weight percent polypropylene homopolymer, about 15 to about 30 weight percent linear low density polyethylene and about 5 to about 15 weight percent polybutene. Other objects appear hereinafter.

Film produced from polypropylene in general, has excellent physical properties at temperatures above 32° F. However, at temperatures below about 32° F., the polypropylene film tends to become brittle which is a disadvantage in a number of applications such as storage of food at temperatures between 10° F. and 32° F. When polypropylene film is used as a packaging material for such food application or general packaging, the film can fail if subjected to physical trauma at temperatures below 32° F. The addition of LLDPE to polypropylene improves the impact resistance of the film composition at room temperature with little, if any, impact resistance improvement below 32° F. However, incorporation of LLDPE and in accordance with this invention polybutene with polypropylene provides a significant enhancement in the impact strength of the composition in the form of film and molded parts at temperatures below 32° F.

SUMMARY OF THE INVENTION

This invention relates to polymer compositions having improved low temperature impact resistance. More particularly, this invention relates to compositions comprising about 55 to about 80 weight percent of a polypropylene, about 15 to about 30 weight percent of a linear low density polyethylene and about 5 to about 15 weight percent of a polybutene.

DESCRIPTION OF THE INVENTION

In greater detail, the compositions of this invention comprise a polypropylene having a melt flow rate as determined by ASTM D-1238 of about 0.5 to about 50 g/10 min, a linear low density polyethylene having a density in the range of about 0.91 to about 0.94 g/cc and a polybutene having a number average molecular weight of about 300 to about 3000 wherein these compositions have a Gardner Impact Strength of 100 in-lb or greater when measured at −40° F. on an 125 mil injected molded plaque and a flexural modulus of about 60,000 to about 120,000 psi.

The polypropylene component of the invented compositions is a homopolymer which has high crystallinity, i.e., at least about 90 weight percent insoluble in hexane and has a broad molecular weight distribution. Preferably, the polypropylene component is at least about 95 weight percent insoluble in hexane. The crystalline polypropylene melt flow rate can range from about 0.5 to about 50 g/10 min as determined by ASTM D-1238 and preferably is in the range of about 0.5 to about 40 g/10 min. For injection molding applications the melt flow rate of the polypropylene is preferably in the range of about 5 to about 40 g/10 min. For film applications the melt flow rate of the polypropylene is preferably in the range of about 0.5 to about 10 g/10 min.

Such polypropylenes and methods for the production thereof are well known to persons skilled in the art. Typically, the propylene polymers are produced by contacting propylene with a transition metal halide-organometallic catalyst system with relatively low temperature and pressure. In order to attain the required crystallinity, it is preferred to employ a high stereospecific catalyst system, although even if a catalyst of relatively low stereospecificity is used, the hexane insolubility of the crystalline fraction and hexane solubility of the noncrystalline fraction allow for convenient separation of the fractions. Polypropylene molecular weights, and accordingly melt flow rates, are conveniently regulated during polymerization by conducting polymerization in the presence of hydrogen. The precise levels of hydrogen to be used in order to attain a given melt flow rate are well known to persons skilled in the art. In addition, polypropylene of the desired melt flow rate can be attained by the controlled degradation of polymer such as by heating in the presence of a source of free radicals such as hydrogen peroxide.

Typically, polypropylene used in the polymer compositions of this invention are formed by contacting propylene monomer or a mixture of olefin monomers and propylene with a polymerization catalyst system comprising a transition metal compound component and an organoaluminum compound component. Also, minor amounts of catalyst modifiers known in the art can be incorporated in or added to such a catalyst system.

Transition metal compounds useful as a catalyst system component usually are compounds of Groups IVB, VB, and VIB of the Periodic Table. Preferably, the transition metal compound is a solid titanium-containing compound such as a titanium halide. Most preferable for propylene polymerization is a titanium trichloride and especially titanium trichloride which has been activated by chemical or physical means. Such activated titanium trichlorides may be made by forming adducts with Lewis bases such as ethers or by supporting a titanium trichloride on a metal oxide or salt. Other suitable transition metal compounds are halides, oxyhalides, alkyloxyhalides, aryloxyhalides, alkoxides or aryloxides of a Group IVB or VB transition metal such as vanadium, zirconium or, preferably, titanium.

Useful organoaluminum compounds include trialkylaluminum, dialkylaluminum halides, mixtures of trialkylaluminum with dialkylaluminum halides and mixtures of trialkylaluminum with alkylaluminum dihalides. Also catalytically effective amounts of mixtures of trialkylaluminum and dialkylaluminum halides can be used in conjunction with alkylaluminum halides. Useful halides include bromides and chlorides and useful alkyl radicals contain from two to about six carbon atoms. The preferable halide is chloride and the preferable alkyl radical is ethyl. Triethylaluminum, triisobutylaluminum, diethylaluminum chloride and mixtures thereof are preferred.

Linear low density polyethylenes which may be used in the compositions according to this invention are random copolymers of ethylene with 1–15 weight percent of higher olefin co-monomers such as propylene, n-butene-1, n-hexene-1, n-octene-1 or 4-methylpentene-1, produced over transition metal coordination catalysts. Such linear low density polyethylenes are commercially available and are produced in liquid phase or vapor phase processes. The density range of the linear low density polyethylene is about 0.91 to about 0.94 g/cc.

Polybutenes suitable for use in the present invention can have a number average molecular weight ($M_n$) measured by vapor phase osmometry of about 300 to about 3000. The polybutenes can be prepared by well-known techniques such as the Friedel-Crafts polymerization of feedstocks comprising isobutylene, or they can be purchased from a number of commercial suppliers such as Amoco Chemical Company, Chicago, Ill., which markets polybutenes under the tradename Indopol ®. Other polyalkenes such as polypropene are contemplated for use in the present invention. A preferred range of number average molecular weight for the polybutene is about 300 to about 1500. A most preferred range of number average molecular weight for the polybutene is about 300 to about 750.

It has been found that for compositions of polypropylene, LLDPE and PB which have less than 15 wt. % LLDPE there is little enhancement of the impact resistance at temperatures less than 32° F. For compositions containing more than 30 wt. % LLDPE there is sufficient loss in flexural modulus to restrict the use of the composition for many injection molding applications. For PP, LLDPE and PB compositions containing less than 5 wt. % PB, the amount of PB is ineffective in imparting softness to films formed from the compositions and for compositions containing more than 15 wt. % PB, too much stiffness is lost and the PB has a tendency to come to the surface of the article made from the composition. A preferred range of compositions comprises about 55 to about 80 weight percent polypropylene, about 10 to about 30 weight percent LLDPE and about 5 to about 15 weight percent PB. A preferred range of composition for a polymer blend with improved low temperature impact resistance is about 55 to about 70 wt. % polypropylene, about 20 to about 30 wt. % LLDPE and about 5 to about 10 wt. % PB when used for film applications.

The compositions of this invention are formulated by blending the polypropylene resin in the form of pellets or powder with LLDPE in a mixing device such as a drum tumbler. The blended polypropylene, LLDPE and stabilizer additive package are introduced to a compounding extruder of the type typically used to produce the final polypropylene product of a polypropylene production plant and compounded at a temperature preferably between about 300° F. and about 500° F. Polybutene in liquid form is metered into the compounding extruder by any suitable metering device by which the flow rate of the polybutene into the extruder can be controlled. Polybutene can be obtained in various molecular weight grades with high molecular weight grades typically requiring heating to reduce the viscosity for ease of pumping the polybutene into the extruder. A stabilizer additive package can also be added to the composition blend if desired.

Alternative methods can be used to blend polypropylene, LLDPE, PB and the additive package. One method is to introduce LLDPE powder, PB liquid and the additive package in powder form into a compounding extruder with powder polypropylene. Another method is to blend pellets of polypropylene and LLDPE and to compound extrude the resulting blend with addition of the PB and the additive package. Also, for small quantities the various materials can be tumble blended together and then extruded to form pellets of the desired composition.

Typical compounding equipment includes extruders such as single screw and twin screw extruders, Banburys and continuous mixers. Depending on the type of extruder used one or more passes may be required to achieve the desired homogeneity of the product. Compounding the blend components in a compounding extruder is the preferred method of formulation. Subsequently the composition is processed with conventional injection molding machines and filmforming extruders.

In the manufacture of finished articles, up to about 50 weight percent, and preferably about 35 weight percent based on the weight of the resin of fillers such as carbon black, glass beads, calcium carbonate, amorphous silica, mica and other well known fillers can be incorporated into the compositions of this invention.

Useful products formed from the compositions of this invention include automobile trim applications and molding applications which require improved low temperature impact resistance. The compositions of this invention are also useful for producing films which are softer by having lower flexural modulus properties compared to neat polypropylene and are therefore more easily conformed to the shape of the object or container that the film contacts. These films are especially useful for packaging applications which require improved low temperature, below 0° C., impact resistance.

In the following Examples 1-4 and comparative Examples A-Q the polymeric materials used were as follows unless otherwise specified. The polypropylene was a 4017 grade of polypropylene from Amoco Chemical Company having a nominal melt flow rate of 6-10 g/10 min. The linear low density polyethylene was a MJX-501 grade from Mobil Chemical Co. having a nominal density of 0.918 g/cc and a nominal melt index of 1.2 dg/min as measured by ASTM D1238. The polybutene was obtained from Amoco Chemical Co. with either a L-14 grade of PB having a nominal number average molecular weight of 320 and a H-300 grade of PB having a nominal number average molecular weight of 1290 being used.

Standard additive packages were prepared containing a hindered phenolic compound such as butylated hydroxytoluene and an acid scavenger such as calcium stearate or dihydroxy talcite. A phosphite processing stabilizer such as tris(nonylphenyl)phosphite and a thermal stabilizer such as dilauryl or distearyl thiodipropionate were also included in the compositions disigned for molding applications. For compositions used in film applications additional additives such as a fatty amide used as a slip agent and a silica antiblock agent were included. The additive packages were used at levels of about 0.42 to about 0.435 weight percent of the total weight of the composition.

Molded test specimens were evaluated according to the following test procedures:

| Test | ASTM Method |
|---|---|
| Tensile Strength | D638 |
| Tensile at Break | D638 |
| Flexural Strength | D790 |
| Flexural Modulus | D790 |
| Elongation | D790 |
| Melt Flow | D1238 |
| Deflection Temperature | D648 |
| Impact Strength | Gardner drop weight |

The Spencer Impact test is a method for determining the relative strength of thin films. The Spencer Impact Strength of a film is determined by using an Elmendorf tearing tester with a Spencer Impact attachment manufactured by the Thwing-Albert Instrument Company. The apparatus has a pendulum mounted, ¾ inch diameter probe with a 0.5 inch spherical radius which is allowed to pass through a specimen of thin film mounted in circular clamps with an inside diameter of 3.5 inch. The relative energy absorbed in puncturing the specimen can be reported in units of grams. Testing for Spencer Impact Strength was determined on approximately 1 mil thick specimens of cast film at 73° F. and 24° F.

The Gardner Impact Strength is a method for determining the drop impact resistance of plastic materials in some molded form using a Gardner Laboratories Model 1G-1120 impact tester consisting of cylindrical weights (2 or 4 pounds) which are dropped through a vertical guide tube from a height up to forty inches and which strike the head of a plunger which rests on the test specimen suspended over a die opening which is slightly larger in diameter than the plunger diameter. As many as 20-25 test specimens from extrusion or compression molded sheet, injection molded plaques or cut from fabricated items should be tested using a staircase or Up-and-Down Method by the following procedure.

1. Determine the nominal thickness of each set of samples tested.
2. Position the test sample over the die opening and rest the radius tip of the plunger on the test sample.
3. Raise the weight to the desired height and release to allow the weight to fall and strike the plunger.
4. Visually examine the impacted area of the test sample for failure which is defined as the presence of any crack visible to the unaided eye.
5. The starting point for the staircase or Up-and-Down method is determined on 5 to 10 impacts by halving or doubling the drop height until a pass-fail lowest height is suggested.
6. Calculate the impact strength from the following equation $$I = \left[ H_o + D\left(\frac{A}{N} \pm 0.5\right)\right]W$$

where
I = mean impact strength, in-pounds or ft-pounds
N = failures or passes, whichever is least
W = Weight of plunger, lb
D = Drop height internal, inches or feet
Ho = Lowest height at which any one of N occurs
± = — for failures, + for passes $$A = \sum_{i=0}^{k} i \cdot n_i$$

where i is the subscript for the height, H, $n_i$ is the number of failures or passes at level i and k is the subscript of the highest level for H.

The invention described herein is illustrated, but not limited, by the following Examples.

EXAMPLE 1

A polymer composition was prepared containing 64.6 weight percent (wt. %) polypropylene, 30 wt. % of LLDPE, 5 wt. % of L-14 grade PB and 0.435 wt. % of the additive package.

The polypropylene and the LLDPE both in powder form were weighed into a 125 pound capacity drum. The standard additive package for polypropylene was preblended in a masterbatch made in a Henschel blender. The additive package represented 0.435 weight percent of the total blend. The powder and additive package were preblended in a drum tumbler before being introduced to a Model ZSK-57 twin-screw extruder of Werner & Pfleiderer for melt compounding of the powder blend, additive package and polybutene.

A Zenith gear pump, Model PEP-10, operating at 24.7 rpm was used to meter the L-14 grade of polybutene at a rate of 14.0 lb/hr into the ZSK-57 extruder. The L-14 polybutene was pumped directly into the throat of the ZSK-57 extruder without being heated. A diverter valve on the extruder supply line was used to calibrate the Zenith metering system for the desired output rates corresponding to 5 weight percent of polybutene in the composition.

The preblend of polypropylene, LLDPE and additive package was fed to the ZSK-57 extruder at a rate of 266 lb/hr. The ZSK-57 screw speed was 300 rpm. The torque range of the extruder motor drive was in the range of 46-52% with a power usage of 21 kilowatts and 51-54 amps. Five zones of the ZSK-57 barrel temperatures were 83°, 381°, 419°, 430° and 445° F., respectively, with a barrel pressure in the range of 425-475 psi.

The die pressure was 200 psi with a polymer melt temperature of 474° F. The ZSK-57 output rate was 280.5 lb/hr.

The ZSK-57 extruder was lined out for 20 minutes before pellet collection began. Finishing conditions recorded during pellet collection and Zenith gear pump data are given in Table II.

Test plaques (125 mil thickness, 5"×5") and flexural modulus test bars (125 mil thickness, 1"×3") were injection molded in a six-ounce Cincinati-Milacron machine at the following conditions:

| | |
|---|---|
| Stock Temperature, °F. | 400 |
| Injection Pressure, psi | 5000 |
| Mold Temperature, °F. | 60 |

The molded test specimens were evaluated according to the tests detailed above. The composition, run conditions and physical properties of test specimens are given in Tables I, II and III, respectively.

EXAMPLE 2

A polymer composition was prepared similar to Example 1 containing 60 weight percent polypropylene including the standard additive package; 30 weight percent of LLDPE; and 10 weight percent of L-14 grade PB. The composition, run conditions and physical properties of test specimens are given in Tables I, II and III, respectively.

COMPARATIVE EXAMPLE A

Comparative Example A was a polymer composition containing polypropylene and the standard additive package with no LLDPE or polybutene. The composition, run conditions and test specimen physical properties are given in Tables I, II and III, respectively.

COMPARATIVE EXAMPLE B

Comparative Example B was a polymer composition containing polypropylene with the standard additive package and 3 weight percent of a higher molecular weight PB, H-300 grade PB, but no LLDPE. The H-300 PB was pumped into the ZSK-57 extruder through a feed port located just downstream from the extruder feed throat with heat applied to the supply line of the Zenith gear pump to lower the viscosity of the H-300 sufficiently so that the H-300 could be pumped at the required rate. The composition, run conditions and test specimen physical properties are given in Tables I, II and III, respectively.

COMPARATIVE EXAMPLE C

Comparative Example C was a polymer composition containing polypropylene with the standard additive package and 5 weight percent of a higher molecular weight PB, H-300 grade of PB, but no LLDPE. The H-300 PB was pumped into the ZSK-57 extruder through a feed port located just downstream from the extruder feed throat with heat applied to the supply line of the Zenith gear pump to lower the viscosity of the H-300 sufficiently so that the H-300 could be pumped at the required rate. The composition, run conditions and test specimen physical properties are given in Tables I, II and III, respectively.

TABLE I

| | Compositions, Weight Percent | | | | |
|---|---|---|---|---|---|
| Example | 1 | 2 | A | B | C |
| Polypropylene | 64.6 | 59.6 | 99.6 | 96.6 | 96.6 |
| Additives | 0.435 | 0.435 | 0.435 | 0.435 | 0.435 |
| LLDPE | 30.0 | 30.0 | — | — | — |
| Polybutene (L-14) | 5.0 | 10.0 | — | — | — |
| Polybutene (H-300) | — | — | — | 3.0 | 5.0 |

TABLE II

| | ZSK-57 Run Conditions | | | | |
|---|---|---|---|---|---|
| Example | 1 | 2 | A | B | C |
| Zenith pump | | | | | |
| speed, rpm | 24.7 | 48.5 | — | 14.0 | 23.7 |
| output, lb/hr | 14.0 | 28.0 | — | 8.4 | 14.0 |
| Powder Feed Rate, lb/hr | 266 | 252 | 280 | 272 | 266 |
| ZSK-57 screw speed, rpm | 300 | 300 | 300 | 300 | 300 |
| ZSK-57 Drive | | | | | |
| Torque Range, % | 46-52 | 43-47 | 44-49 | 45-49 | 44-48 |
| Power, kw | 21 | 20 | 20 | 21 | 20 |
| Motor, amps | 51-54 | 49-51 | 50-52 | 50-52 | 49-51 |
| ZSK-57 Barrel Temperature, °F. | | | | | |
| Zone 1 | 83 | 90 | 116 | 108 | 91 |
| Zone 2 | 381 | 389 | 411 | 389 | 390 |
| Zone 3 | 419 | 417 | 421 | 416 | 414 |
| Zone 4 | 430 | 430 | 431 | 430 | 430 |
| Zone 5 | 445 | 442 | 441 | 442 | 442 |
| Melt Temperature at die, °F. | 474 | 465 | 465 | 468 | 467 |
| Barrel Pressure | 424-475 | 400-450 | 425-500 | 425-475 | 400-475 |
| Die Pressure, psi | 200 | 175 | 175 | 175 | 150 |
| Output rate, lb/hr | 280.5 | 283.8 | 282.6 | 280.4 | 281.3 |

TABLE III

| | Test Specimen-Physical Properties | | | | |
|---|---|---|---|---|---|
| Example | 1 | 2 | A | B | C |
| Melt flow rate, g/10 min | 12.96 | 8.67 | 9.49 | 10.72 | 11.28 |
| Heat Deflection Temperature, °F. | 195 | 198 | 255 | 235 | 230 |
| Tensile at yield, psi | 3349 | 2821 | 4979 | 4725 | 4545 |
| Tensile at break, psi | 2565 | 2739 | 2958 | 2889 | 2841 |
| Elongation, % | 240 | 350 | 125 | 145 | 175 |
| Flexural Strength, psi | 3856 | 2824 | 6557 | 5997 | 5635 |
| Flexural Modulus, psi | 87,000 | 65,000 | 179,000 | 177,000 | 169,000 |
| Gardner Impact, in-lb (125 mil Injection Molded Plaques) | | | | | |
| at 70° F. | 124 | 140 | 4 | 8 | 12 |
| at −40° F. | 28 | 120 | 4 | 4 | 4 |

The twin screw-produced composition of Example 2 exhibited excellent Gardner Impact Strength properties of 140 in-lb at 70° F. and 120 in-lb at −40° F.

Example 1 exhibited excellent Gardner Impact Strength properties of 124 in-lb at 70° F. and an improved Gardner Impact of 28 in-lb at −40° F. compared to Comparative Examples A, B and C. The use of a higher molecular weight PB, H-300 grade PB, had no effect on the Gardner Impact at −40° F. compared to Example A containing only polypropylene.

The compositions of Examples 3 and 4 and Comparative Examples D through Q were tumble-blended prior to extrusion in a Killion one and one quarter inch, two stage, single screw extruder equipped with a strand die and pelletizer. The temperature of the extruded melt was maintained at about 450° F. with the pelletized material re-extruded using the same equipment and processing conditions to ensure that the compositions were homogeneous.

COMPARATIVE EXAMPLE D

Comparative Example D was a polymer composition containing polypropylene with 0.42 weight percent of a standard additive package but no PB or LLDPE. Physical properties for this composition are summarized in Table IV below.

COMPARATIVE EXAMPLE E

Comparative Example E was a composition containing 96.59 weight percent of polypropylene, 3 weight percent of L-14 grade PB and 0.41 weight percent of the standard additive package. Physical properties for this composition are summarized in Table IV below.

COMPARATIVE EXAMPLE F

Comparative Example F was a composition containing 91.58 weight percent of polypropylene, 8 weight percent of L-14 grade PB and 0.42 weight percent of the standard additive package. Physical properties for this composition, are summarized in Table IV below.

COMPARATIVE EXAMPLE G

Comparative Example G was a composition containing 84.58 weight percent of polypropylene, 10 weight percent of LLDPE, 5 weight percent of L-14 grade PB and 0.42 weight percent of a standard additive package. Physical properties for this composition are summarized in Table IV below.

TABLE IV

| | Comparative Examples | | | |
|---|---|---|---|---|
| Example | D | E | F | G |
| Polypropylene, wt. % | 99.58 | 96.59 | 91.58 | 84.58 |
| Polybutene, wt. % | — | 3 | 8 | 5 |
| LLDPE, wt. % | — | — | — | 10 |
| Additives, wt. % | 0.42 | 0.41 | 0.42 | 0.42 |
| Physical Properties | | | | |
| Melt Flow Rate, g/10 min | 9.1 | 11.2 | 18.1 | 12.5 |
| Heat Deflection Temperature, °F. | 212 | 212 | 200 | 208 |
| Flexural Properties | | | | |
| Flexural Modulus, psi | 203,000 | 161,000 | 123,000 | 137,000 |
| Maximum Strain, % | 2.16 | 2.15 | 2.19 | 2.17 |
| Tensile Properties | | | | |
| Yield Strength, psi | 4890 | 4490 | 3881 | 3894 |
| Yield Elongation, % | 9.68 | 12.71 | 16.34 | 16.60 |
| Tensile Impact, ft-lb/in$^2$ | 22 | 22 | 30 | 34 |
| Notched Izod Impact, ft-lb/in | 0.45 | 0.43 | 0.44 | 0.68 |
| Gardner Impact, in-lb (50 mil Injection Molded plaques) | | | | |
| 73° F. | <2 | 3.0 | 27.2 | 30.0 |
| 0° C. | <0 | <2 | 7.0 | 5.2 |
| 14° F. | <2 | <2 | <2 | <2 |
| Film Properties (ca. 1 mil cast film) Spencer Impact, g | | | | |
| 73° F. | 114 | 332 | 690 | 512 |
| 24° F. | 15 | 39 | 112 | 55 |
| 12° F. | 61 | 78 | 67 | 67 |

Table IV summarizes data for polypropylene-containing compositions containing PB without LLDPE, Comparative Examples D-F and PB with a low level of LLDPE, Comparative Example G. Although the Spencer Impact at 24° F. increased with an eight percent loading of PB in the absence of LLDPE, only small increases in the tensile impact and Gardner Impact strengths were observed at below ambient temperatures and no increase was observed in the Notched Izod Impact strength. Comparative Example G containing five percent PB and 10 percent LLDPE, showed a more general increase in impact properties although the Spencer Impact at 24° F. was lower than that for the Comparative Example F containing 8% PB and no LLDPE.

COMPARATIVE EXAMPLE H

Comparative Example H was composition containing polypropylene and 0.42 weight percent of a standard additive package but no PB or LLDPE. Physical properties for this composition are summarized in Table V below.

COMPARATIVE EXAMPLE I

Comparative Example I was a composition containing 79.58 weight percent of polypropylene; 20 weight percent of LLDPE and 0.42 weight percent of a standard additive package. Physical properties are given in Table V below.

COMPARATIVE EXAMPLE J

Comparative Example J was a composition containing 69.58 weight percent of polypropylene, 38 weight percent of LLDPE and 0.42 weight percent of the standard additive package. Physical properties are given in Table V below.

EXAMPLE 3

Example 3 was a composition containing 74.58 weight percent of polypropylene, 5 weight percent of L-14 grade PB, 20 weight percent of LLDPE and 0.42 weight percent of the standard additive package. Physical properties are given in Table V below.

EXAMPLE 4

Example 4 was a composition containing 64.58 weight percent of polypropylene; 5 weight percent of L-14 grade PB, 30 weight percent of LLDPE and 0.42 weight percent of the standard additive package. Physical properties are given in Table V below.

TABLE V

| Example | \multicolumn{5}{c}{Examples and Comparative Examples} |
|---|---|---|---|---|---|
|  | H | I | 3 | J | 4 |
| Polypropylene, wt. % | 99.58 | 79.58 | 74.58 | 69.58 | 64.58 |
| Polybutene, wt. % | — | — | 5 | — | 5 |
| LLDPE, wt. % | — | 20 | 20 | 30 | 30 |
| Additives, wt. % | 0.42 | 0.42 | 0.42 | 0.42 | 0.42 |
| Physical Properties |  |  |  |  |  |
| Melt Flow Rate, g/10 min. | 10.4 | 7.4 | 10.8 | 6.5 | 8.2 |
| Heat Deflection Temperature, °F. | 211 | 201 | 190 | 194 | 175 |
| Flexural Properties |  |  |  |  |  |
| Flexural Modulus, psi | 200000 | 172000 | 115000 | 146000 | 112000 |
| Maximum strain, % | 2.19 | 2.19 | 2.19 | 2.20 | 2.10 |
| Tensile Properties |  |  |  |  |  |
| Yield Strength, psi | 4846 | 4315 | 3656 | 4010 | 3433 |
| Yield Elongation, % | 9.60 | 10.43 | 17.41 | 11.01 | 19.16 |
| Break Strength, psi | 2878 | 2765 | 2563 | 2631 | 2608 |
| Break Elongation, % | NM | 176 | 253 | 142 | 291 |
| Tensile Impact, ft-lb/in$^2$ | 21 | 50 | 68 | 69 | 60 |
| Notched Izod Impact, ft-lb/in | 0.43 | 0.68 | 0.77 | 0.85 | 1.52 |
| Film Properties (ca. 1 mil cast film) |  |  |  |  |  |
| Spencer Impact, g |  |  |  |  |  |
| 73° F. | 66 | 513 | 727 | 517 | 728 |
| 24° F. | 20 | 29 | 43 | 30 | 104 |

NM - Not measured

From Table V it can be seen that compositions of the present invention, Examples 3 and 4, have Spencer Impact strengths greater than 700 gram measured at 73° F. and greater than 40 gram measured at 24° F. Examples 3 and 4 are compositions which have greater Notched Izod Impact properties and which impact greater softness to films due to the lower flexural modulus properties compared with Comparative Example H with polypropylene and Comparative Examples I and J with polypropylene and LLDPE.

COMPARATIVE EXAMPLE K

Comparative Example K was a composition containing 79.58 weight percent of polypropylene, 20 weight percent of a 408 grade of high density polyethylene from Amoco Chemical Co. and 0.42 weight percent of a standard additive package. The physical properties are given in Table VI below.

COMPARATIVE EXAMPLE L

Comparative Example L was a composition containing 74.58 weight percent polypropylene, 5 weight percent of L-14 grade PB, 20 weight percent of a 408 grade of high density polyethylene from Amoco Chemical Co., and 0.42 weight percent of a standard additive package. The physical properties are given in Table VI below.

TABLE VI

| Polypropylene/High Density Polyethylene/Polybutene Blends | | |
|---|---|---|
| Example | K | L |
| Polypropylene, wt. % | 79.58 | 74.58 |
| Polybutene, wt. % | — | 5 |
| Polyethylene, wt. % | 20 | 20 |
| Additives, wt. % | 0.42 | 0.42 |
| Physical Properties |  |  |
| Melt Flow Rate, g/10 min. | 8.0 | 11.4 |
| Heat Deflection Temperature, °F. | 219 | 218 |
| Flexural Properties |  |  |
| Flexural Modulus, psi | 217000 | 143000 |
| Maximum Strain, % | 2.20 | 2.20 |
| Tensile Properties |  |  |
| Yield Strength, psi | 515 | 4343 |
| Yield Elongation, % | 8.94 | 13.42 |
| Break Strength, psi | 2668 | 2563 |
| Break Elongation, % | 43 | 84 |
| Tensile Impact, ft-lb/in$^2$ | 38 | 31 |
| Notched Izod Impact, ft-lb/in | 0.50 | 0.74 |
| Film Properties (ca. 1 mil cast film) |  |  |
| Spencer Impact, g |  |  |
| 73° F. | 21 | 290 |
| 24° F. | 18 | 20 |

From Table VI it can be seen that substituting high density polyethylene for LLDPE by itself or in combination with polybutene does not impart the increased impact resistance at 24° F. that the present invention does with LLDPE and PB.

COMPARATIVE EXAMPLES M–Q

Comparative Examples M, N, O, P and Q are compositions of 64.58 weight percent of polypropylene; 30 weight percent of LLDPE; 0.42 weight percent of a standard additive package and 5 weight percent of various low molecular weight additives for comparison with Example 4 which used 5 weight percent of polybutene. The mineral oil was a white mineral oil. No. 35 (USP grade), manufactured by Amoco Oil Company. The atactic polypropylene consisted mainly of material with a highly atactic structure produced as a by-product of polypropylene homopolymer production. The polyethylene wax was a low molecular weight polyethylene wax sold by Hoechst Celanese under the designation of PE 190. Drapex 6.8 was an epoxidized soybean oil produced by the Argus Division of Witco. Exxelor VM-3 was a high molecular weight olefinic rubber obtained from Exxon Chemical Company. Physical properties are summarized in Table VII below.

TABLE VII

Comparison of Low Molecular Weight Additives to PB

| Example | M | N | O | P | Q |
|---|---|---|---|---|---|
| Formulation: | | | | | |
| Polypropylene, wt. % | 64.58 | 64.58 | 64.58 | 64.58 | 64.58 |
| LLDPE, wt. % | 30 | 30 | 30 | 30 | 30 |
| Mineral Oil, wt. % | 5 | — | — | — | — |
| Atactic PP, wt. % | — | 5 | — | — | — |
| PE Wax, wt. % | — | — | 5 | — | — |
| Drapex 6.8, wt. % | — | — | — | 5 | — |
| Exxelor VM-3, wt. % | — | — | — | — | 5 |
| Additives, wt. | 0.42 | 0.42 | 0.42 | 0.42 | 0.42 |
| Physical Properties: | | | | | |
| Melt Flow Rate, g/10 min. | 7.9 | 8.0 | 6.4 | 7.6 | 5.4 |
| Heat Deflection Temperature, °F. | 179 | 170 | 178 | 182 | 180 |
| Flexural Properties | | | | | |
| Flexural Modulus, psi | 116000 | 138000 | 165000 | 138000 | 147000 |
| Maximum Strain, % | 2.09 | 2.08 | 2.11 | 2.10 | 2.10 |
| Tensile Properties | | | | | |
| Yield Strength, psi | 3382 | 3643 | 4071 | 3496 | 3680 |
| Yield Elongation, % | 19.21 | 13.29 | 9.86 | 12.26 | 12.32 |
| Break Strength, psi | 2521 | 2467 | 2575 | 2524 | 2543 |
| Break Elongation, psi | 363 | 199 | 140 | 277 | 197 |
| Tensile Impact, ft-lb/in$^2$ | 67 | 67 | 56 | 69 | 74 |
| Notched Izod Impact, ft-lb/in | 0.86 | 0.71 | 0.84 | 1.39 | 2.01 |
| Gardner Impact, in-lb. (50 mil Injection Molded plaques) | | | | | |
| 73° F. | 92.2 | 96.7 | 103.8 | 89.2 | 99.3 |
| Film Properties (ca. 1 mil cast film) Spencer Impact, g | | | | | |
| 73° F. | 545 | 495 | 330 | 602 | 573 |
| 24° F. | 77 | 52 | 48 | 91 | 109 |

Table VII and the entries for Example 4 in Table V shows that PB gives better low temperature Spencer Impact strengths at the same levels of LLDPE and low molecular weight additives. Example Q demonstrates an equivalent low temperature Spencer Impact as PB, however the resulting film is not as soft due to a higher flexural modulus. Also, the low molecular weight additive used in Example Q is more expensive than PB.

That which is claimed is:

1. A polymer composition having improved low temperature impact resistance comprising:
   a) about 55 to about 80 weight percent of a polypropylene having a melt flow rate as measured by ASTM D-1238 of about 0.5 to about 50 g/10 min,
   b) about 15 to about 30 weight percent of a linear low density polyethylene having a density of about 0.91 to about 0.94 g/cc, and
   c) about 5 to about 15 weight of a liquid polybutene having a number average molecular weight of about 300 to about 3000.

2. The composition of claim 1 wherein the polypropylene is a homopolymer having a melt flow rate as measured by ASTM D-1238 of about 0.5 to about 40 g/10 min.

3. The composition of claim 1 wherein the polybutene has a number average molecular weight of about 300 to about 1500.

4. The composition of claim 1 containing up to about 50 weight percent based on the weight of the polymer composition of a filler.

5. The composition of claim 4 containing up to about 35 weight percent based on the weight of the polymer composition of said filler.

6. The composition of claim 4 wherein the filler is selected from the group consisting of carbon black, glass beads, calcium carbonate, amorphous silica and mica.

7. The composition of claim 1 in the form of a molded object.

8. A polymer composition having improved impact resistance at temperatures below 0° C. and ambient temperature comprising:
   a) about 55 to about 80 weight percent of a polypropylene having a melt flow rate of about 0.5 to about 10 g/10 min as measured by ASTM D-1238,
   b) about 15 to about 30 weight percent of a linear low density polyethylene having a density of about 0.91 to about 0.94 g/cc, and
   c) about 5 to about 15 weight percent of a liquid polybutene having a number average molecular weight of about 300 to about 750.

9. The composition of claim 8 wherein said composition comprises about 55 to about 70 weight percent of said polypropylene, about 20 to about 30 weight percent of said linear low density polyethylene and about 10 to about 15 weight percent of said polybutene.

10. The composition of claim 9 wherein said polybutene has a number average molecular weight of about 300 to about 500.

11. The composition of claim 8 in the form of a film.

12. The composition of claim 1 wherein said composition has a Gardner Impact Strength of 100 in-lb or greater when measured at −40° C. on an 125 mil injected molded plaque and a flexural modulus of at least about 60,000 psi.

13. The composition of claim 8 wherein said composition has a Spencer Impact Strength when measured on a 1 mil cast film of 40 grams or greater at −4.4° C. and 700 grams or greater at 22.8° C.

* * * * *